United States Patent [19]

Meisel

[11] Patent Number: 4,718,096
[45] Date of Patent: Jan. 5, 1988

[54] SPEECH RECOGNITION SYSTEM
[75] Inventor: William S. Meisel, Encino, Calif.
[73] Assignee: Speech Systems, Inc., Tarzana, Calif.
[21] Appl. No.: 928,643
[22] Filed: Nov. 5, 1986

Related U.S. Application Data

[63] Continuation of Ser. No. 698,577, Feb. 6, 1985, abandoned, which is a continuation-in-part of Ser. No. 495,674, May 18, 1983, abandoned.

[51] Int. Cl.$^4$ .............................................. G10L 5/00
[52] U.S. Cl. ...................................... 381/43; 381/169
[58] Field of Search ....................... 381/26, 169, 41-43

[56] References Cited

U.S. PATENT DOCUMENTS

| | | | |
|---|---|---|---|
| 3,646,576 | 12/1972 | Griggs | 381/46 |
| 3,679,830 | 7/1972 | Uffelman et al. | 381/41 |
| 3,752,929 | 8/1973 | Fletcher | 381/41 |
| 4,206,324 | 6/1980 | Hirikawa et al. | 381/26 |
| 4,466,117 | 8/1984 | Gorike | 381/26 |

OTHER PUBLICATIONS

Hillix et al, "Computer Recognition of Spoken Digits etc.", J. Ac. Soc. Am., 1965, pp. 790-796.

Primary Examiner—Emanuel S. Kemeny
Attorney, Agent, or Firm—Blakely, Sokoloff, Taylor & Zafman

[57] ABSTRACT

A plurality of microphones are disposed on a body to detect the speech of a speaker. First, second and third microphones may respectively detect the sounds emanating from the speaker's mouth, nose and throat and produce signals representing such sounds. A fourth microphone may detect the fricative and plosive sounds emanating from the speaker's mouth and produce signals representing such sounds. The signals from the different microphones are compared to allow the discrimination of certain speech sounds. For example, a high amplitude of the signal from the nose microphone relative to that from the mouth microphone indicates that a nasal sound such as m, n, or ng was spoken. Identifying signals are provided to the speech recognition system to aid in identifying the speech sounds at each instance. The identifying signals can also select a microphone whose signal can be passed on to the recognition system in its entirety. Signals may also be provided to identify that spoken words such as "paragraph" or "comma" are actually directions controlling the form, rather than the content, of the speech by the speaker. The selected signals, the identifying or classifying signals and the signals representing directions may be recovered by the system of this invention. The selected and identifying signals may be processed to detect syllables of speech and the syllables may be classified into phrases or sentences. The result may then be converted to a printed form representing the speech or utilized in the operation of another device.

20 Claims, 19 Drawing Figures

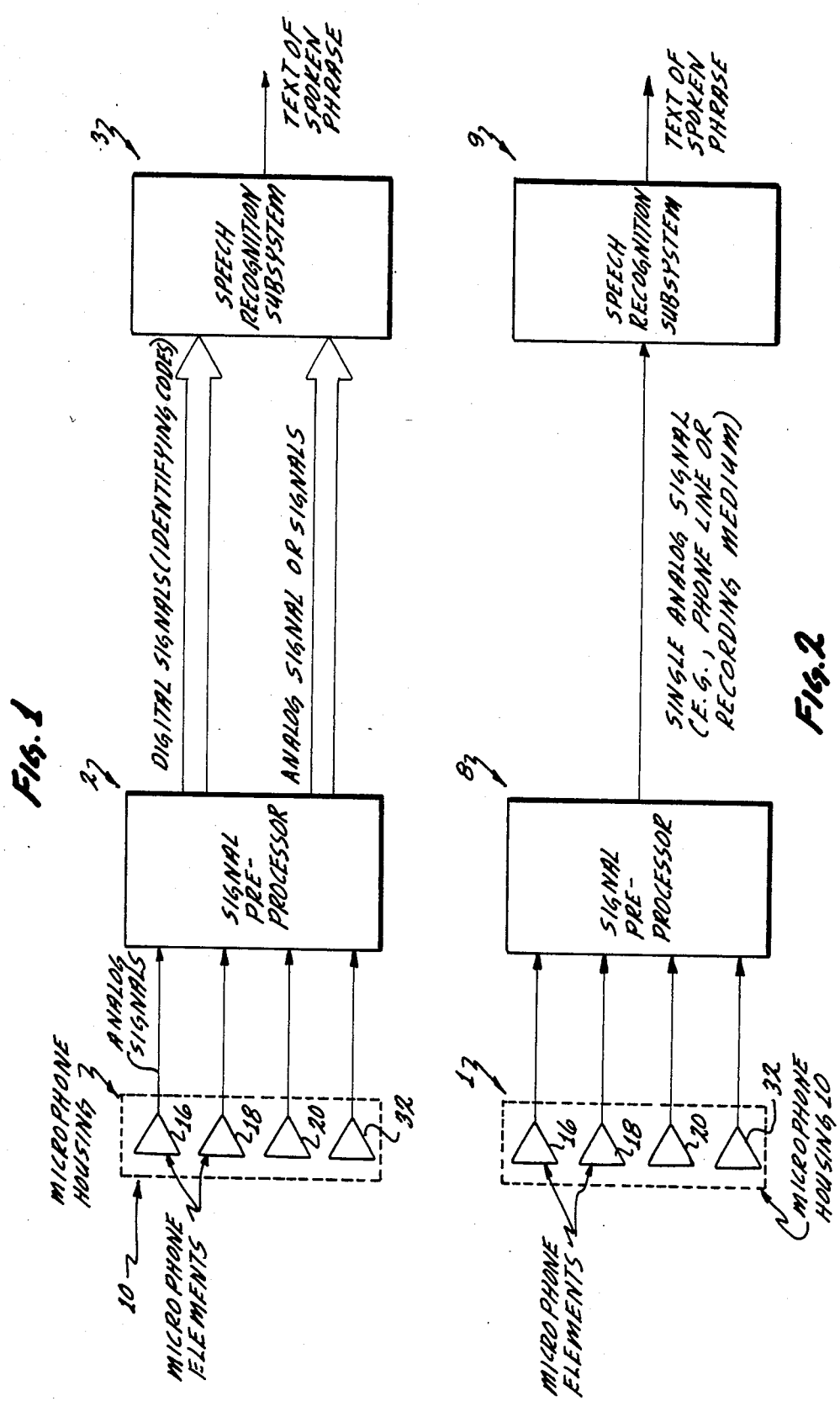

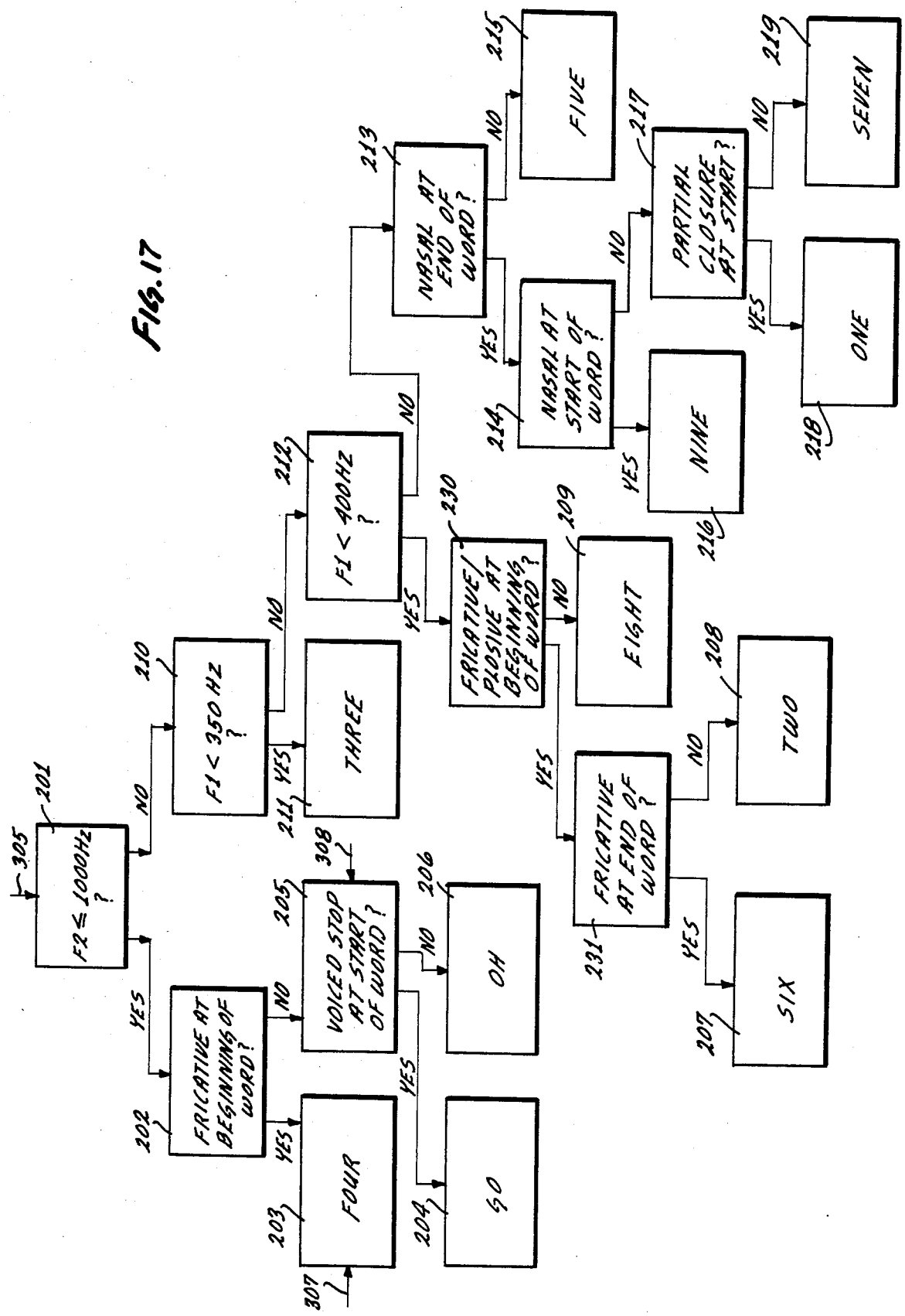

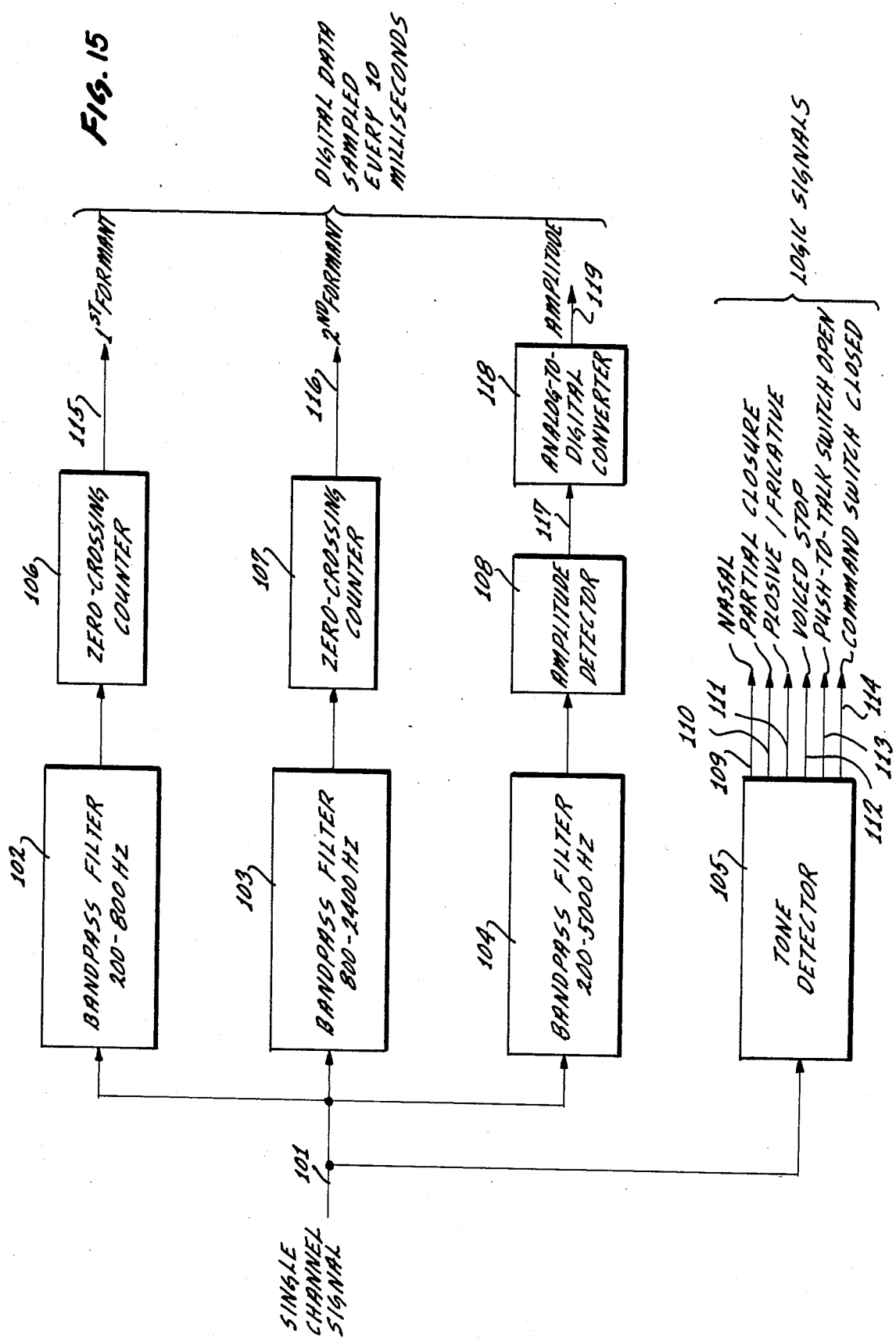

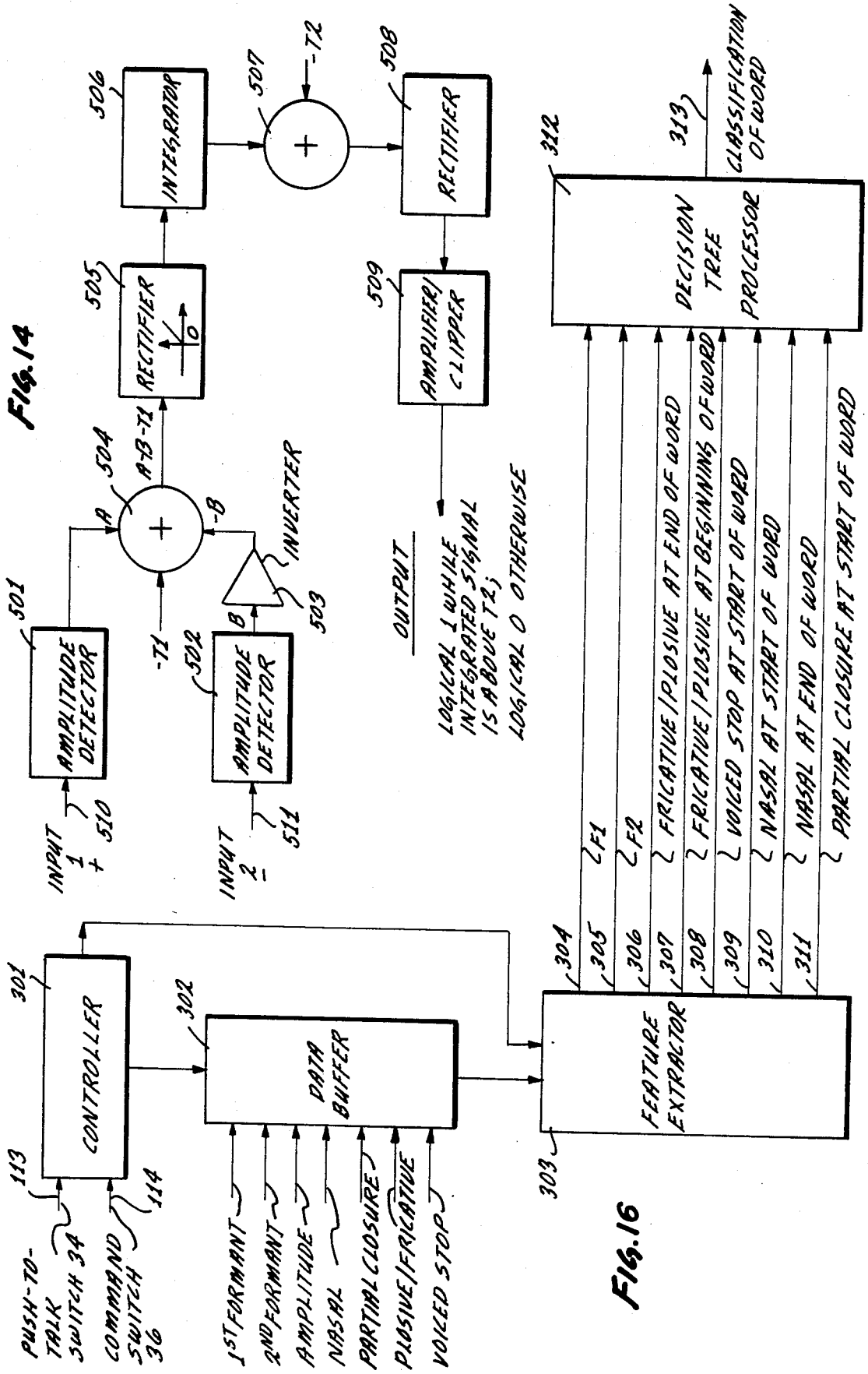

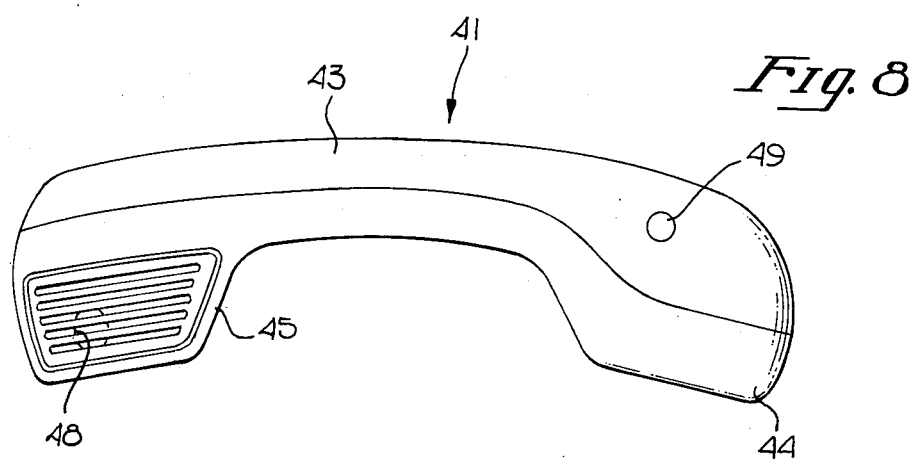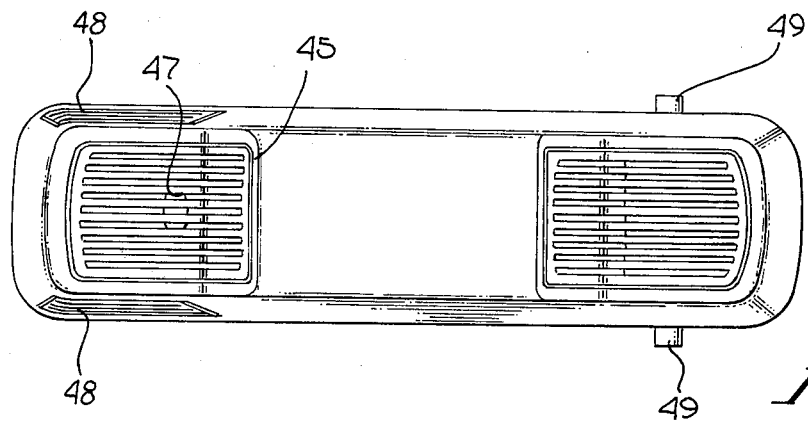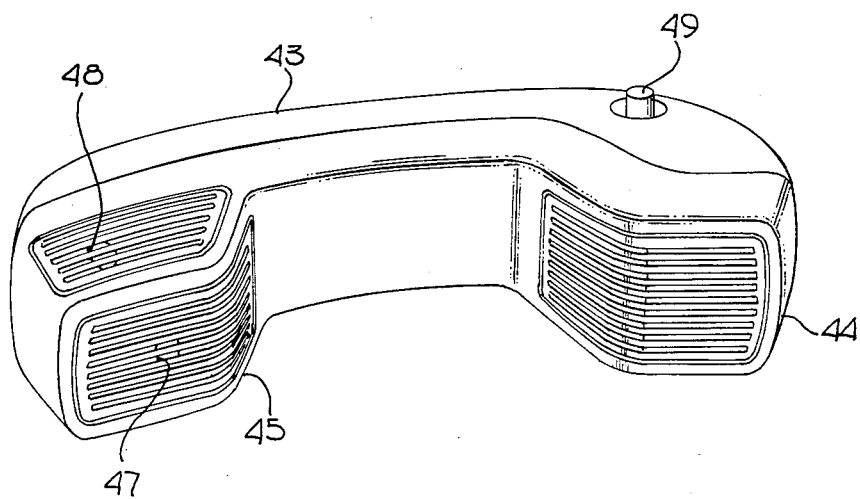

SPEECH RECOGNITION SYSTEM

This is a continuation of application Ser. No. 698,577 filed Feb. 6, 1985, which is a CIP of Ser. No. 495,674 filed May 18, 1983, both abandoned.

This invention relates to a system for the automatic recognition of spoken speech. It is applicable to speech spoken as individual words or to natural speech spoken without pauses between words. More particularly, the invention relates to a speech recognition system usable in the normal work environment of the speaker, particularly under conditions where there is background noise and where the speaker can continue to perform other duties. The investigation also relates to a microphone assembly which is adapted to be used in such a system.

The potential utility of a machine that can respond to spoken commands or transcribe them is well understood (J. L. Flanagan, "Computers that Talk and Listen", Proc. IEEE, April 1976). Much research has been performed in this area (W. A. Lea, "Speech Recognition: Past, Present, and Future," in *Trends in Speech Recognition* (W. A. Lea, ed.), Prentice-Hall, Englewood Cliffs, N.J. 1980).

Speech is entered into a speech recognition system by speaking into a microphone or similar acoustic transducer. In laboratory environments, speech is often entered through a high-quality desk-mounted microphone which is not strongly sensitive to the distance of the speaker's mouth from the microphone element. Such a microphone is not suited for application environments because it will pick up background noise and gets in the way when other tasks are to be performed. In actual applications, a close-talking, head-mounted microphone is typically used, such as disclosed in U.S. Pat. No. 4,039,765 (issued to Tichy et al on Aug. 2, 1977). Some applications envision the use of telephone handsets (U.S. Pat. No. 4,181,821).

Speech recognition systems proposed to date envision implicitly or explicitly a single speech signal produced by a microphone or acoustic transducer (e.g., see Lea, op cit; U.S. Pat. Nos. 4,087,630; 4,156,868; 4,277,644; 4,292,470; and 4,348,550.) No information is passed to the recognizer as to the physical source of the sound (e.g., nasal versus mouth).

Sakoe (U.S. Pat. No. 4,239,936) uses two microphones, but only one is the speech signal. The second microphone is placed so as to avoid the speech signal and to detect background noise with a view toward minimizing its effect on recognition accuracy.

No recognition system can extract from a speech signal information which is not present in the signal. Single microphone systems, particularly when embodied with close-talking microphones, lose information useful in speech recognition. Close-talking microphones do not adequately pick up sounds which are not near the microphone; hence, a microphone near the mouth will pick up nasal and throat sounds poorly. Further, a single microphone yields no direct clue as to the physical source (e.g., mouth, nose or throat) of the sound, even though this information is valuable in recognition.

It is an objective of this invention to preserve information on the source of the sound for use by the recognizer.

It is a further objective of this invention to allow close-talking microphones to be used, but to avoid loss of information from sound sources other than the mouth (e.g., the nasal cavity and/or the throat).

It is a further objective of this invention to utilize this additional information effectively in a speech recognition subsystem to augment recognition performance.

It is a further objective of this invention to provide a microphone housing which will provide consistent information on the physical source of the sound, but will still allow a handheld microphone, for ease in changing tasks.

SUMMARY OF THE INVENTION

In the preferred embodiment of the invention, two microphones are disposed in a housing to detect the speech of the speaker. The first microphone is disposed so as to detect sounds substantially emanating from a corner of the speaker's mouth. The second microphone is disposed so as to detect sounds substantially emanating from the nose of the speaker.

In this manner, the two microphones are located such that each responds to certain sounds with a relatively stronger signal than the other microphone. Specifically, the first microphone which, as noted above, is disposed generally adjacent to a corner of the mouth, responds best to vowel and consonant sounds produced when the mouth is open.

The nose microphone will respond more strongly to nasals (such as n, m, and ng) than the mouth microphone; the mouth is largely closed during nasals. Thus, one can compare the amplitude of the signal from the nose to that from the mouth to determine if a nasal is being spoken.

In alternative embodiments, a throat microphone and/or a second mouth microphone disposed at the front of the mouth may also be used. The throat microphone, if used, detects the vibration of the vocal cords, or "voicing". All vowels and some consonants are voiced. By comparing the signal from the throat microphone to that of the mouth microphone, one can distinguish, for example, voiced from unvoiced stop consonants. Stop consonants (such as b, d, g, p, t, and k) are pronounced by closing the vocal tract briefly. While the vocal tract is closed, little sound comes from the mouth. For unvoiced stops (p, t, and k), the vocal cords do not vibrate and little sound comes from the throat as well. For voiced stops (b, d, and g), however, the vocal cords vibrate during the closure. Comparison of the mouth and throat signals thus aids detection of voiced stops. A similar argument applies to distinguishing voiced fricatives (v, z, and th) from unvoiced fricatives (f, s, and sh).

The second mouth microphone, if used, is placed directly in front of the mouth, where air flow from the mouth hits it directly. It will respond more than the other microphones to sounds which cause rapid air movement like plosives (e.g., p and k) or fricatives.

The selective effect of the microphones is enhanced by using close-talking, directional microphones. Such microphones decrease rapidly in sensitivity with progressive distances of the sound source from the microphone. Close-talking microphones have the secondary advantage that they respond very little to background noise, such as may occur in an office environment.

Each microphone generates a different speech signal. This invention uses a pre-processor to translate this multiplicity of signals into a form usable in a recognition device. The pre-processor compares signals from the microphones. The result of these comparisons are coded to reflect detected events, e.g., the presence of a nasal or a voiced stop. This coded information is passed to a speech recognition subsystem, along with a selected signal or signals from the microphones. The codes provided by the comparison also can determine which signal or signals should be passed to the recognition subsystem.

The means by which the codes and signals are passed depend upon two alternative means of connecting the pre-processor to the recognition subsystem. One method is direct connection; in this method, the codes are passed as digital signals on separate wires distinct from the microphone signals.

The second method is through the medium of a tape recorder or similar analog recording device. A recording is made and transported to a physically separate recognition subsystem. The recognition subsystem then plays the tape to retrieve the information. In this second method, only one channel may be available for all signals and codes. In this case, the codes are interposed with the signal as a brief burst of pure tones, using a tone generator. The particular tones selected depend on the code to be conveyed. The signal conveyed must at any one time be from one microphone, but the particular microphone chosen can be controlled by the codes.

Switches on the housing of the multiple-microphone device may be used by the speaker to convey additional information. In particular, the speaker may press a switch to indicate that the word being spoken, such as "paragraph" or "comma", are to be interpreted as directions controlling the form, rather than the content, of the speech. The closure of this switch is detected and is incorporated into the codes passed to the recognition subsystem.

The selected signals and the codes are passed to the recognition subsystem. The selected signals and the codes may be processed to detect and classify syllables of speech, and the identified syllables may be combined into phrases or sentences. The phrases or sentences may then be converted to a printed form representing the speech. They may alternatively be delivered as computer-readable text to a word processor or computer system.

In the drawings:

FIG. 1 shows the major components of the recognition system arranged with a direct connection between them;

FIG. 2 shows the major components of the recognition system arranged with a single analog channel (e.g., a phone line or a recording medium) connecting them;

FIG. 8 is a side elevational view of a second embodiment of a microphone assembly forming part of this invention;

FIG. 9 is a bottom plan view of the microphone assembly taken along line 9—9 of FIG. 8;

FIG. 10 is a perspective view of the microphone assembly of FIG. 8;

FIG. 14 shows details of an amplitude detector/comparator/integrator unit (ADCI) also included in FIG. 13;

FIG. 15 shows the input stage of a speech recognition subsystem included in the recognition system of FIG. 2 for decoding the information in the single analog signal;

FIG. 16 shows how a speech recognition subsystem included in FIG. 2 follows an input stage shown in FIG. 15;

FIG. 17 shows methods used by a decision tree processor included in FIG. 16 to classify individual spoken digits;

Figure 3:
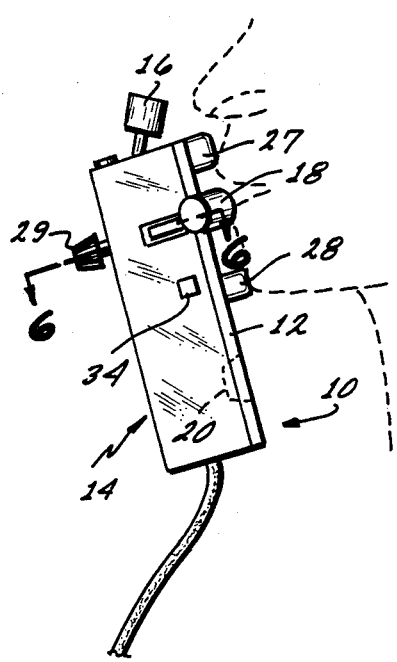
FIG. 3, is a side elevational view of a first embodiment of a microphone assembly forming a part of this invention and illustrates the disposition of the microphone relative to a speaker's face when the speaker is speaking information that he wishes to have printed.
Figure 4:
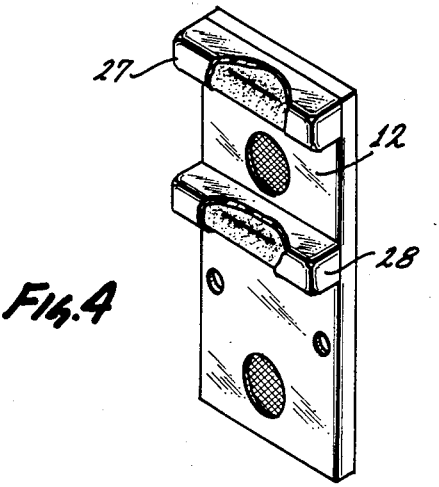
FIG. 4 is an enlarged perspective view of a face-plate included in the microphone assembly of FIG. 3.
Figure 6:
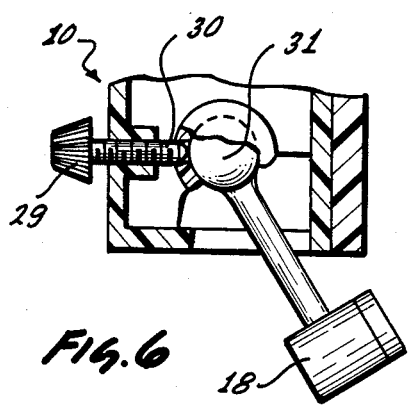
FIG. 6 is an enlarged fragmentary sectional view of the microphone assembly and is taken substantially on the line 6—6 of FIG. 3.
Figure 5:
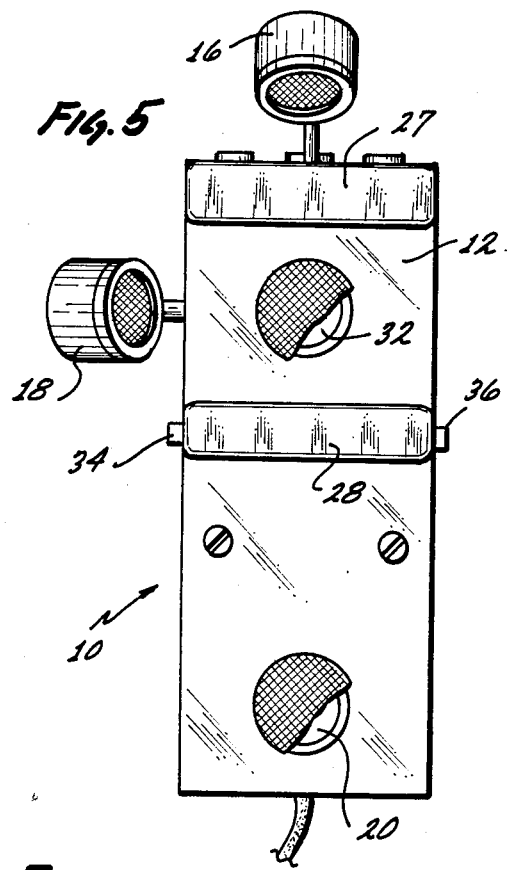
FIG. 5 is an enlarged elevational view of the microphone assembly of FIG. 3 as seen from the surface adjacent the speaker's face.
Figure 7:
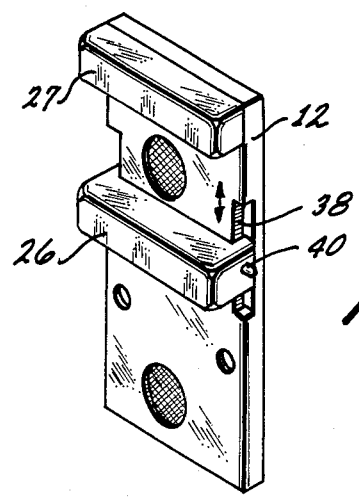
FIG. 7 is an enlarged perspective view, similar to FIG. 2, of a modified faceplate.

In FIG. 1, the three main subsystems of the recognition system are shown: (1) a microphone housing 10, with a plurality of microphones 16, 18, 20 and 32; (2) a signal preprocessor 2; and (3) a speech recognition subsystem 3. The microphone housing 10 holds the microphones 16, 18, 20 and 32 in appropriate positions. These microphones introduce multiple signals to the signal pre-processor 2.

The pre-processor 2 processes the signals from the microphones 16, 18, 20 and 32 to determine at each instant imbalances in the relative amplitude of each microphone. These imbalances are indicative of the production of certain speech sounds. The detected imbalances are coded as Boolean variables in a conventional manner to create a digital code corresponding to the pattern of imbalances.

The digital code is passed to the recognition subsystem 3 which uses it as part of its recognition method. In some simpler applications, these codes may be sufficient for completing the recognition. In most cases, at least one of the analog signals from the microphones 16, 18, 20 and 32 will also be passed to the recognition subsystem 3. The recognition subsystem 3 utilizes the digital codes and the analog signal to recognize the speech. It provides an indication of the content of the speech as text readable by a person or computer, or as control signals to control an external device.

It is unnecessary, and probably impractical, for all the signals to be analyzed by the recognition subsystem 3. The microphone 18 at the corner of the mouth provides the most information generally. However, during the production of nasals, for example, the nose microphone 16 may provide more information. The pre-processor 2 can select instant-by-instant which signal is introduced to the speech recognition subsystem 3.

In FIG. 2, another configuration of the overall speech recognition system is shown. The difference between this configuration and that of FIG. 1 is the connection between a signal pre-processor 8 and a speech recognition subsystem 9. The connection is not with several lines, both digital and analog, as in FIG. 1. It is instead over a single analog channel, as in FIG. 2.

This channel may be a phone line or a recording medium (such as magnetic tape). The configuration shown in FIG. 2 may be used in some cases where the microphones and the pre-processor 8 are in a different locale than the speech recognition subsystem 9. It is noted that the "analog" connection may also be in a digital form which is converted from the analog signal in, for example, a digital phone system.

In the system of FIG. 2, the pre-processor 8 condenses into a single line the information sent over many lines in the system of FIG. 1. This more difficult case may be seen in the particular embodiment discussed.

In one embodiment of the disclosed invention, the microphone assembly includes a housing and four microphones as shown in FIGS. 3 through 7. In a second embodiment, the microphone assembly includes a housing, three microphones and a speaker as shown in FIGS. 8 through 11.

The microphone assembly including the housing and the four microphones as illustrated in FIGS. 3, 4, 5, 6 and 7 is discussed first. The microphone assembly is generally indicated at 10 in those FIGS. The microphone assembly 10 forms a part of this invention and is especially adapted to be used with a system included in this invention. The microphone assembly 10 includes the housing 14 and a removable faceplate 12. The microphones 16, 18, 20 and 32 are adapted to be supported by the housing 14 at selective positions on the housing. The microphone 16 is adapted to sense the nasal sounds emanating from the nose of a speaker; the microphone 18 is disposed to sense the sounds emanating from the mouth of the speaker; the microphone 20 is disposed to detect vibration of the vocal cords through sounds emanating from the throat of a speaker; and the microphone 32 is designed to detect plosive and sibillant sounds from the mouth.

A faceplate 14 is adapted to be attached to the housing 12 as by fastening screws 22. The faceplate 14 may be constructed in accordance with the facial characteristics of an individual speaker. For example, the faceplate 14 may be provided with a pair of spacers 27 and 28, each of which extends outwardly from the faceplate at a position dependent upon the facial characteristics of the individual speaker. The spacer 27 may be positioned against the upper lip of the speaker and the spacer 28 may be positioned against the chin of the speaker.

The distance between the spacers 27 and 28 is individual to the speaker to assure that the microphones 16, 18 and 20 will be disposed respectively adjacent the nose, mouth and throat of the speaker. The dimensions of the spacers may also be particular to the speaker. The spacer 27 also provides some acoustical separation between the nose and mouth microphones. This enhances the difference between the sounds reaching each microphone.

The spacers 27 and 28 may be covered with a resilient material such as a rubber or a plastic to provide for a variable force of the spacers against the face of the speaker in accordance with the disposition of the assembly 10 against the speaker's face and to enhance the comfort of the speaker while the assembly 10 is disposed against the speaker's face.

When the faceplate 12 is properly positioned against the speaker's face, the microphone 18 is positioned adjacent one side of the speaker's mouth. This results from the disposition of the microphone 18 at one corner of the housing 12 in skewed relationship to the housing. The microphone 18 is adjustable relative to the housing 12 by loosening a knob 29 on a shaft 30 which extends through the housing from the microphone. When the knob 29 is loosened on the shaft 30 the microphone can be adjustable in any one of three coordinate axes by providing the microphone with a universal joint 31 at a position adjacent one end of the shaft 30. After the microphone 18 is adjusted, the knob is tightened on the shaft 30, to hold the microphone in fixed position. The microphone 18 detects speech sounds from the mouth; its placement is such that it is not overly affected by breath sounds.

The microphone 32 may also be disposed to detect certain sounds emanating from the speaker's mouth. The microphone 32 is adapted to be disposed directly in front of the speaker's mouth to detect such sounds as fricatives (sounds produced with letters such as f, v, and s) and plosives (sounds produced with letters such as p, t and k). As will be appreciated, fricatives and plosives are not loud sounds; they are characterized by releases of breath which are detected most clearly by the microphone 32 because of its location directly in front of the mouth.

A switch 34 is disposed on the housing 12 at one side panel of the body. The switch 34 is adapted to be manually closed by the depression of a forefinger against the adjacent side panel of the housing 12. The switch 34 is adapted to be manually closed during the time that the words being spoken by the speaker are intended to be reproduced in a printed or typewritten form.

A switch 36 is also disposed on the body 12, preferably extending from the side panel of the body opposite the switch 34. The switch 36 is adapted to be manually closed by the depression of a forefinger against the adjacent side panel of the housing 12. The switch 36 constitutes a "command" or "direction" switch to indicate punctuation (such as a period or a question mark), formating (such as an indication of a paragraph or an indentation or a capitalization of a word) and subsets of the vocabulary (like a number or a proper name). When the speaker presses the switch 36 and speaks a word such as the word "paragraph", the data processor converting the speech to the printed information produces a paragraph in the printing of the information rather than printing the word "paragraph".

The microphone assembly described above has a separate faceplate 12 for each individual speaker. A separate faceplate 12 for each individual speaker is advantageous for hygenic reasons since the speaker tends to breathe into the faceplate and even tends at times to touch the faceplate with his mouth and nose. It will be appreciated, however, that a single faceplate can be provided for all speakers on a universal basis. When a single faceplate is universally provided, one of the spacers on the faceplate can be adjustable relative to the other in accordance with the individual characteristics of the speaker's face. This can be accomplished by providing guides 38 (FIG. 7) in the faceplate at the opposite ends of the faceplate and by providing for a movement of the spacer 26 along the guides to any position which will defined the distance between the upper lip and the chin of the speaker. Screws 40 can then be tightened against the guides 38 to retain the spacer 26 in the desired position.

Alternatively, inasmuch as, in most cases, accurate speech recognition can be accomplished with only two microphones, one for sensing sounds emanating from the mouth of the speaker and the other for sensing sounds emanating from the nose of the speaker, a microphone assembly 41 as illustrated in FIGS. 8-10 may be utilized. In this connection, it has been found that persons using a voice recognition system are much more comfortable utilizing the microphone assembly 41 which is similar in size, shape and feel to an ordinary telephone handset, rather than the microphone assembly described above with reference to FIGS. 3 through 7.

Referring now to FIGS. 8, 9 and 10 the microphone assembly 41 comprises a housing 43 having a first end 44 corresponding to the earpiece of an ordinary telephone handset and a second end 45 corresponding to the mouthpiece of an ordinary telephone handset. The mouthpiece 45 includes a microphone 47 which functionally corresponds to the corner of the mouth microphone 18 of FIGS. 3 though 7. In this alternate embodiment of the microphone assembly, two nasal microphones 48 are utilized, one on each side of the mouthpiece, such that when the handset is held in the conventional manner, one or the other is positioned on top and points in the general direction of the nose. That is, depending upon whether the handset is held in the right hand and pressed against the right ear or is held in the left hand and pressed against the left ear, one of nasal microphones 48 is positioned to point in the general direction of the nose.

In addition to the microphones, microphone assembly 41 also includes two buttons 49, one on each side of the handset disposed adjacent the portion of the handset corresponding to the earpiece. The buttons are disposed such that when the handset is held in the conventional manner, either the right thumb or left thumb will naturally press against one of the two buttons 49 depending upon whether the handset is held in the left hand or the right hand. That is, the switches are mounted such that regardless of whether the handset is being held with the left hand or the right hand, the thumb of either the right hand or left hand is positioned over one of the buttons 49 such that it is very easily actuated.

Of course, regardless of which hand is holding the handset, only one button 49 is actuated at a time, thus indicating whether the handset is being held in the left hand or the right hand. In particular, by utilizing a simple logic circuit to detect which of the buttons 49 is being depressed, a signal can be generated indicative of which of the two buttons is being pressed. In this manner, it is possible to switch on only one of the two nasal microphones 48 as a function of whether the handset is being held in the left hand or the right hand so that only the nasal microphone positioned to point in the general direction of the nose is active.

While it is possible to provide two separate channels for each of the nasal microphones, in the present embodiment, a single nasal output channel is provided and one of the two nasal microphones is switched onto the channel depending upon which of the buttons 49 is being depressed.

As described above, each of the buttons 49 perform the same function as switch 34 disposed on housing 12 as described above with reference to FIGS. 3 through 7. That is, a button 49, like switch 34, is adapted to manually close a switch during the time that words are being spoken by the speaker which are intended to be reproduced in a printed or typewritten form. Additionally, each of the buttons 49 is adapted to perform the function of switch 36 of the microphone assembly described above with reference to FIGS. 3 through 7 wherein depressing the button causes a signal to be generated such that spoken words are interpreted as a "command" or "direction" to indicate punctuation, formatting and sub-sets of the vocabulary. The foregoing is accomplished by providing buttons 49 with a first detent position and a second detent position. Thus, by pressing the button to the first detent position activates normal "talk" mode and pressing harder through the second detent activates the "command" mode.

Figure 11:
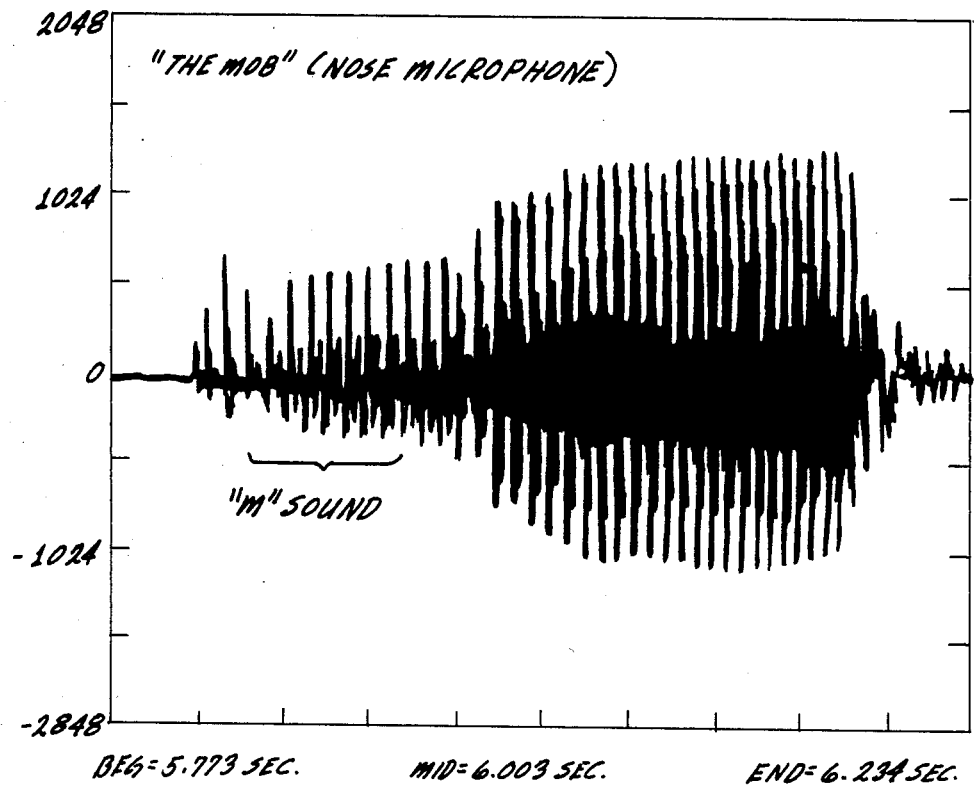
FIG. 11 illustrates waveforms of the words "The Mob" as detected by a microphone adjacent the nose of the speaker.

In the preferred embodiment, the microphones are supported in a solid sound absorbing substance with an elasticity measure below 35 Shoor. The sound absorbing substance is placed in the handset housing 43 such it forms a supporting seal around the microphone sides and rear to the contacting surface of the housing. In this manner, sound is prevented from entering the microphones except through desired external ports provided in the housing adjacent to the microphones. Additionally, the sound absorbing substance attenuates sound vibrations in the housing from being mechanically coupled into the microphones. Additionally, a small gauge wire is used to connect the microphone to the internal circuitry to avoid coupling sound vibrations through the wiring FIG. 11 shows signals indicating the amplitude pattern recorded by a microphone near a speaker's nose when the words "The Mob" are spoken. The abscissa or horizontal axis indicates the period of time in which the words "The Mob" are spoken. The ordinate or vertical axis indicates the pattern of the signals which pass through the microphone 16 as the words "The Mob" are spoken. The portion of the signals representing the "M" sound are indicated by a bracket near the left end of the horizontal axis. As will be seen, the nasal sounds representing the "M" sound have a relatively large amplitude.

Figure 12:
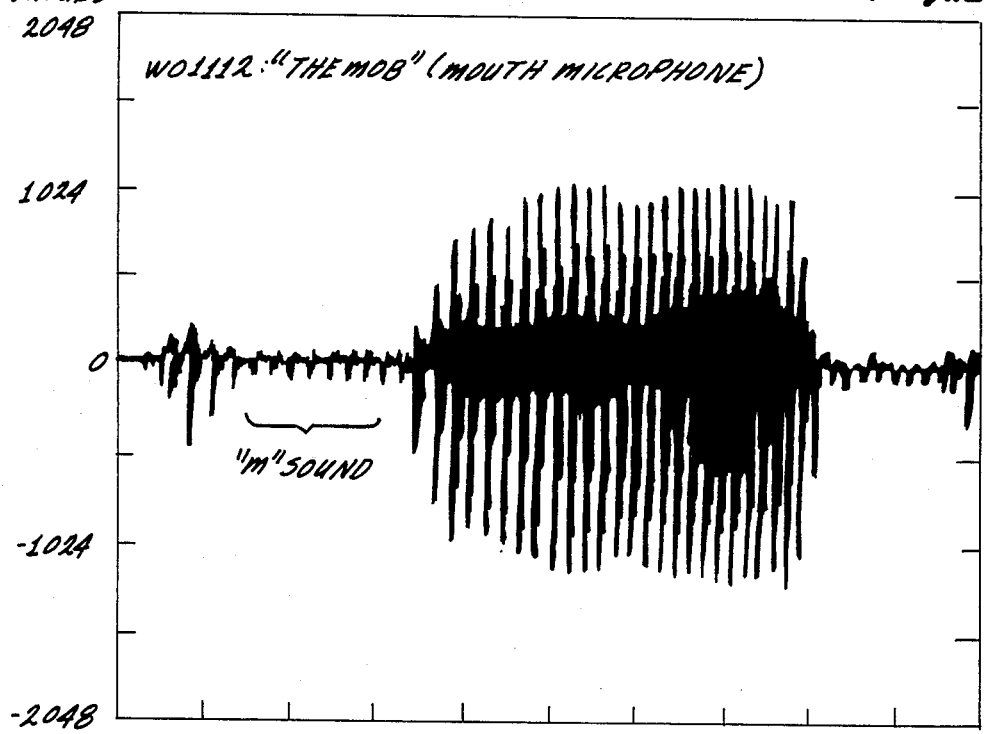
FIG. 12 illustrates waveforms of the words "The Mob" as detected by a microphone adjacent the mouth of the speaker.

FIG. 12 illustrates the pattern of signals which are recorded by a close-talking mouth microphone when the words "The Mob" are spoken A "close-talking mouth microphone" is one in which the microphone is disposed in very close proximity to the speaker's mouth. For example, a close-talking mouth microphone is shown in FIG. 1 of U.S. Pat. No. 4,039,765 issued on Aug. 2, 1977, to Thomas H. Tichy. This type of microphone is generally supported on a rod which extends from a headband disposed over the head of the speaker. It is the type of microphone generally used by telephone operators.

As will be seen from FIG. 12, the "M" sound in the word "The Mob" has a relatively low amplitude as sensed by a close-talking mouth microphone. This confirms that the "M" sound is nasal and that it is important, or at least desirable, to detect the nasal component in order to provide a reliable recognition of speech content. Similar proof can be provided of the importance of recording the sounds emanating from the throat or immediately in front of the mouth for certain words in order to provide a reliable recognition of such spoken words.

Figure 13:
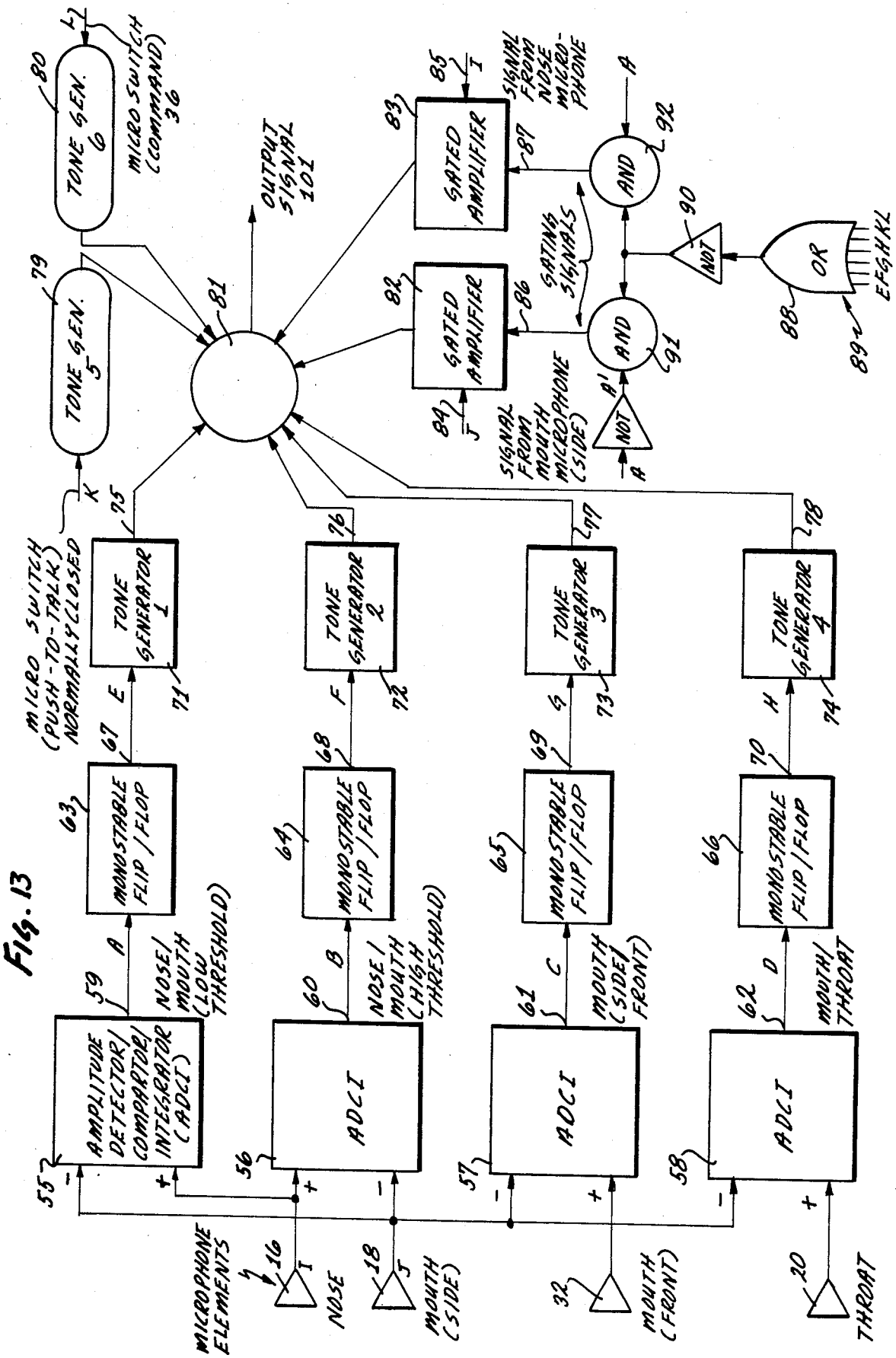
FIG. 13 shows detail of a signal pre-processor included in the recognition system FIG. 2.

The outputs of the microphone elements may be processed by the signal pre-processor 8 in FIG. 2. FIG.13 shows the construction and operation of this pre-processor in some detail. Inputs to the system shown in FIG. 10 are from microphones 16, 18, 20 and 32 in the microphone assembly shown in FIGS. 3 through 7 or from microphones 47 and 48 in FIGS. 8-10. Inputs from an individual pair of microphones are introduced to individual ones of amplitude detector/- comparator/integrator (ADCI) units in FIG. 13. There are 4 ADCI units shown in FIG. 13 at 55, 56, 57 and 58.

The detailed construction and operation of the ADCI units 55, 56, 57 and 58 are shown in FIG. 14. The two inputs to the ADCI unit 55 are respectively introduced to amplitude detectors 501 and 502. Each of amplitude detectors 501 and 502 rectifies and filters the input signal so as to follow the envelope of the speech signal. The output of each of the amplitude detectors 501 and 502 thus represents the amplitude of the input signal on an instant-by-instant basis.

The signal from one of the amplitude detectors, such as the amplitude detector 502, is inverted as at 503 to provide the negative value of the input amplitude. This inverted value is summed with the signal from the detector 501 and with a negative threshold −T1 to provide a signal which is positive only when the absolute value of the signal "A" from the amplitude detector 501 exceeds the absolute value of the signal "B" from the amplitude detector 502 by at least the threshold T1. This signal is the output of the summing unit 504, which acts as a comparator.

The signal from the summing unit 504 is introduced to a rectifier 505 so that there is no output from the rectifier 505 unless the signal at the input is positive. Thus the output of rectifier 505 will be non-zero only if the first input 510 to the amplitude detector 501 exceeds the second input 511 to the amplitude detector 502 by at least the threshold T1. The signal from the rectifier 505 is introduced to an integrator 506, which may be a simple resistor-capacitor network. The integrator 506 will integrate the signal from the rectifier 505 over a particular period of time dependent upon the time constant of the integrator circuit. The output of the integrator will thus be the integrated amount by which the input signal amplitude "A" exceeds the input signal amplitude "B" by at least the threshold T1 over a short period of time.

The output of the integrator 506 is fed to a comparator circuit 507. The comparator feeds the rectifier 508. The output of the rectifier 508 is non-zero when, and only when, the integrated output from integrator 506 exceeds a threshold T2. The output of the rectifier 508 is thus non-zero when the amplitude of the first input 510 exceeds the amplitude of the second input 511 in sufficient amplitude and for a sufficient duration to constitute an indication that a particular event is occurring. Such an event may illustratively be the occurrence of a nasal when the input 510 is from the nasal microphone 16 and the input 511 is from the mouth microphone 18.

An amplifier/clipper 509 in FIG. 14 amplifies the signal from the rectifier 508 and provides a high gain in such amplification. The amplifier/clipper 509 clips at an amplitude equivalent to that of a "logical true" signal for the digital circuitry. The output of the amplifier/clipper 509 is therefore a logical signal which can be used to drive logical circuitry. It will provide a high output value (interpreted here as being logically true) when the input conditions discussed above exist.

As will be seen in FIG. 13, the ADCI circuits 55, 56, 57 and 58 are fed by four (4) different pairs of the microphones 16, 18, 20 and 32. The unit 55 is fed by the nose and mouth microphones 16 and 18, unit 56 by the same microphones, unit 57 by the side mouth and and front mouth microphones 18 and 32, and unit 58 by the throat microphone 20 and the mouth microphone. The difference between the ADCI units 55 and 56 is that the threshold T1 of the unit 55 is set lower than the threshold T1 of the unit 56. Thus, the output 59 from the ADCI unit 55 will occur with a smaller difference in inputs than will the output 60 from the ADCI unit 56. The output 59 will become logically true when there is a partial closure of the mouth as when saying the "w" sound in the word "won". The output 60 will become logically true when a nasal is being pronounced. The output 61 will become logically true when a plosive or fricative is being pronounced. The output 62 will become logically true when a voiced stopped sound is being pronounced.

The logical signals 59, 60, 61 and 62 are introduced to monostable flip-flops 63, 64, 65 and 66. Each of the monostable flip-flops 63, 64, 65 and 66 is constructed to produce a 1 signal for a particular period of time and then to produce a 0 signal for a particular period of time when its input is a 1. Each of the monostable flip-flops 59, 60, 61 and 62 will continue to provide a series of signals that alternate between 0 (logical false) and 1 (logical true) as long as its input is true (or 1). Otherwise, the respective outputs 67, 68, 69 and 70 of the flip-flops 63, 64, 65 and 66 will be zero. The alternate production of the 1 and 0 signals from the flip-flops during the introduction of a 1 signal to the flip-flops allows a signal from the mouth or nose microphones to be alternately sampled between non-sampling intervals represented by the pulses of the monostable flip-flops so that the acoustic characteristics of the signals are not masked by tone generators 71, 72, 73 and 74.

Each of the tone generators 71, 72, 73 and 74 produces a tone when its input is logically true. Each tone generator produces a different tone. Thus the respective outputs 75, 76, 77 and 78 from the tone generators 71, 72, 73 and 74 will be a series of pulse tones alternately produced between the sampling of the signals from the nose or mouth microphones during the time that the logical inputs 59, 60, 61 and 62 are true. The particular tones produced will depend upon the physical source of the speech signal.

The tones from the generators 71, 72, 73 and 74 are summed with other signals in the summing amplifier 81 to produce an output signal 101. In the absence of the other signals, the tone produced on the output 101 will indicate the characteristic of the sound being produced by the speaker. In the absence of outputs from any of the ADCI units, the output signal 101 will be from one of the microphones 16 or 18.

A signal 84 (also designated as J) from the mouth microphone 18 is inserted into the gated amplifier 82. A signal 85 (also designated as I) from the nose microphone 16 is inserted into a gated amplifier 83. The signals 84 and 85 are respectively passed through the amplifier 82 and 83 under the control of gating signals 86 and 87. Logical circuits 88, 90, 91, 92 and 93 control the production of the gating signals. The respective outputs J and I of the amplifiers 82 and 83 go into the summing amplifier 81.

Signals E, F, G and H (corresponding to the outputs 67, 68, 69 and 70) from the flip-flops 63, 64, 65 and 66 and signals K and L from the switches 34 and 36 on the microphones control inputs to an OR-gate 88. This OR-gate feeds a NOT-gate 90, which in turn feeds two AND-gates 91 and 92. The gates 91 and 92 are also fed by signals A and A' which arise from the output 59 of the ADCI unit 55. Since the output 59 indicates whether there is an excess of energy from the nasal channel, the signal passed to the summing amplifier 81 from the gated amplifiers 82 and 83 will be from the nose microphone 16 when that microphone level exceeds the level from the mouth microphone 18 by the threshold T1 set in the unit 55. When the nose microphone 16 does not exceed the amplitude of the signals from the mouth microphone 18 by the threshold T1, the output passed to the summing amplifier 81 will be from the mouth microphone 18.

FIG. 13 also shows tone generators 79 and 80 controlled by the switches on the housing 12. The switch 36 is the command switch in FIG. 5 and the switch 34 is the push-to-talk switch in FIG. 5. The switch 34 is normally closed, i.e., it will produce a logically true signal when the switch is released, i.e., when the speaker is not talking. It therefore serves to delineate the beginning and end of a spoken word. The switches 34 and 36 respectively control the generators 79 and 80. Each of the generators 79 and 80 generates different tones than the tone generators 71, 72, 73 and 74 and different from the tones generated by the other one of the generators 79 and 80. The signals from the tone generators 79 and 80 are fed to the summing amplifier 81 to contribute to the output signal 101 from the summing amplifier 81 when the switches are pressed.

Although the tone generators 71, 72, 73, 74, 79 and 80 are shown in separate stages, it will be appreciated that the tone generators can constitute a single generator which resonates at individual frequencies in accordance with selected energizing from the flip-flops 63, 64, 65, 66 and the switches 34 and 36. In this sense, the tone generators can be considered as equivalent to the tone generators in a touch-tone telephone system.

In summary of the subsystem shown in FIG. 13, the output of the speech pre-processor unit shown in FIG. 2 will be either a tone, a combination of tones, a signal from the nose microphone 16 or a signal from the mouth microphone 18. Because of the arrangement of the logic in FIG. 13, there will be no signal from the microphones 16 and 18 when there are signals from any of the tone generators. Because of the monostable operation of the flip-flops 63, 64 65 and 66, portions of the speech signal will be sent to the output signal 101 even during a condition which causes a logical true signal at the outputs from the flip-flops 63, 64, 65 and 66. This signal can be analyzed by the speech recognition subsystem 9 of FIG. 2.

The input portion of the speech recognition subsystem 9 is shown in FIG. 15. The single analog signal 101 shown in FIG. 13 and described above is the input to this subsystem. The signal 101 may be carried directly through an analog channel such as a phone line or through a medium such as an analog tape recording. If an analog tape recording is used, a tape play-back unit may be used at the input to this system, but such a unit is not shown. However, such a tape play-back unit is well known in the art.

A tone detector circuit 105 in FIG. 15 examines the signal 101 for the presence of pure tones such as from the tone generators 71, 72, 73, 74, 79 and 80. The tone detector 105 is logically true on particular output lines depending upon on which tones are present. These output lines 109, 110, 111, 112, 113 and 114 will thus be logically true under the same conditions, respectively, that the signals from the flip-flops 63, 64, 65 and 66 and the tone generators 79 and 80 in FIG. 13 are true. The tone detector 105 may be formed from a series of sharp filters which produce a logical signal on the output of the tone detector when the output of one of the narrow filters is sufficiently high. Each of the filters has a frequency corresponding to the frequency of the signals generated by an associated one of the tone generators 71, 72, 73, 74, 79 and 80. This technology is well understood and forms the basis of the touch-tone detector circuits used in communication circuitry.

The output of the tone detector 105 thus produces logical signals which indicate characteristics of the speech sound detected by the various microphone elements. More conventional information on the spectrum and amplitude of the signal is obtained from bandpass filters 102, 103 and 104 in FIG. 15. The bandpass filter 102 has a range of approximately 200–800 Hz, which corresponds to the common range of the first energy peak, the first "formant" of speech. The filter 103 has a range of approximately 800–2400 Hz, which corresponds to the range of the second "formant" of speech. The filter 104 has a range of approximately 200–5000 Hz, which covers most of the energy in the speech signal.

The output of the filter 102 is passed to a zero-crossing counter 106 which counts the number of times that the signal crosses zero. The number of crossings in any given interval is a measure of the predominant frequency component in the signal. Similarly, the output of filter 103 is passed to a zero-crossing counter 107. Thus the outputs 115 and 116 of the zero-crossing counters 106 and 107 are respectively estimates of the frequency of the first and second formants of speech. These quantities are useful in detecting characteristics of vowels of certain words. In conjunction with the logic signals presented from the tone detector 105, they help to obtain an identification of both the consonants and vowels of the speech signal.

In addition, the output of the filter 104 is passed to an amplitude detector 108. Thus, the output 117 from the amplitude detector 108 is the amplitude of the overall speech signal. It provides a means of locating the beginning and end of words as well as the centers in time of these words. This output is digitized by an analog-to-digital converter 118. The outputs 115, 116 and 119 from the zero-crossing counters 106 and 107 and the amplitude detector 108 are sampled every ten (10) milliseconds and provide repeated estimates of the signal amplitude and the first and second formants. When the zero-crossing counters 106 and 107 are sampled they are automatically reset to zero so that the value sampled every ten (10) milliseconds is an estimate of the frequency content in each formant in the previous ten (10) milliseconds.

The outputs from the stages shown in FIG. 15 go into the final stages of the speech recognition subsystem 9 of FIG. 2. These final stages shown in some detail in FIG. 16. In discussing the final stages of the speech recognition subsystem, certain assumptions will be made for purposes of illustration. For example, the digits one through nine, the word "oh" (used to mean the number "zero"), and the word "go" used to indicate a new set of digits will be distinguished. Each word is considered to be spoken in isolation.

A controller unit 301 in FIG. 16 responds to outputs from the stage shown in FIG. 15. These outputs indicate when the push-to-talk switch 34 or the command switch 36 is pressed. When the push-to-talk switch 34 is pressed, the controller 301 knows that data is being entered. It accordingly instructs a data buffer 302 to store the incoming data every ten (10) milliseconds. The data stored in the data buffer 302 is shown as input lines to the data buffer from the logic signals 109–112 and the data signals 115, 116 and 119 in FIG. 15. The sequence of values from these input lines is stored every ten (10) milliseconds for the duration of the speech signal while the push-to-talk switch 34 is pressed.

The controller 301 in FIG. 16 indicates to a feature extractor 303 when the push-to-talk switch is released. The feature extractor 303 then examines the data in the data buffer 302 to locate the beginning and end of the spoken word as measured by the amplitude signal 119. When the amplitude signal 119 first rises, the feature extractor 303 examines the following sixty (60) milliseconds to determine if any of the logical signals 109, 110, 111 or 112 is true. If there is an indication of a fricative or plosive at the beginning of the word, i.e., if the signal 111 is true at the beginning of the word, then the feature extractor sets a line 307 to a logical true. If there is a voiced stop at the start of the word as indicated by a true signal on the line 112, a line 308 is set true. If there is a nasal at the start of the word as indicated by a high amplitude on the line 109, a line 309 is set high. If there is a partial closure at the start of the word as indicated by a high amplitude on the line 110, a line 311 is set true.

In addition, the feature extractor 303 finds the maximum amplitude between the two end points of the word. The sixty (60) milliseconds surrounding the time at which the maximum amplitude occurs are then examined. For that period, the median zero crossing values from the signals 115 and 116 are calculated by the feature extractor 303. These values are passed by the feature extractor 303 to the lines 304 and 305 as respective estimates of the first and second formants F1 and F2.

Thus eight (8) numerical values represented by the lines 304-311 are created by the feature extractor 303 from one (1) spoken word. The decision tree processor 312 in FIG. 16 uses these eight (8) values to decide the classification of the word, regardless how long the word is or how much original data is stored in the data buffer.

FIG. 17 shows the processing performed by the decision tree processor to produce the final classification of the spoken word for the example discussed above of distinguishing between the different digits. The decision tree processor looks initially at the value of F2 as taken from the line 305 to see if it is less than or equal to 1000 Hz (node 201). If it is, it will then evaluate the signals in a node 202. If it is not, it will evaluate the question in a node 210. If the node 202 is evaluating, it looks to see if there is a fricative at the beginning of the word as indicated by a true state in the line 307. If that is true, the tree indicate that the word spoken is "four". It it is not true, a node 205 provides an evaluation. The node 205 determines whether there is a voiced stop at the start of the word by looking to see if the line 308 is true. If the line 308 is true, the word is designated by the processor to be "go" (node 204). If the line 308 is not true, it is designated by the processor to be "oh" in a node 206.

If the node 210 receives an input, it evaluates whether the signal F1 is at a frequency of less than approximately 350 Hz. If the answer is yes, a node 211 is activated to indicate that the spoken word is the digit "three". If the answer is no, the signal F1 is passed to a node 212. The node 212 then evaluates to determine whether the frequency of the F1 signal is less than approximately 400 Hz. If it is, the node 212 passes the signals in the decision tree processor 312 to a node 230. If it is not, the node 212 passes the signals in the processor 312 to a node 213.

When the node 230 receives the signals from the node 212, it determines if there is a fricative at the beginning of a word. If the answer is no, a node 209 produces a signal to indicate that the digit is "eight". If the answer is yes, a node 231 operates on the signals from the processor 312 to determine if there is a fricative at the end of the word. If the answer is yes, a node 207 is operative to indicate that the digit is "five". If the answer is no, a node 208 is operative to indicate that the digit is "two".

If required, the node 213 operates to determine if there is a nasal at the end of the word. If there is not, a node 215 becomes operative to indicate that the word is "five". If there is a nasal at the end of the word, a node 214 becomes operative to determine if there is a nasal at the start of the word. If there is, a node 216 becomes operative to indicate that the word is "nine". If there is not, a node 217 becomes operative to determine if there is a partial closure at the start of the word. If there is a partial closure at the start of a word, a node 218 becomes operative to indicate that the word is "one". If there is not such a partial closure at the start of a word, a node 219 becomes operative to indicate that the word is "seven".

The classification provided by proceeding down the tree such as shown in FIG. 17 and described above is the output of the processor and of the system. That output can be printed, displayed, used to control some apparatus or simply stored for some future use.

As described above, the relatively simple application relating to digits has been described above to exemplify the operation of the invention. It is clear that a more complicated decision tree and the use of more than eight values in that tree can improve recognition accuracy. The provision and use of such more complicated decision trees are believed to be within the knowledge of a person skilled in the art.

In FIG. 16, an input 114 to the controller 301 is provided which indicates when the command switch 36 is closed. One potential use for the command switch 36 in the application discussed is that, when the command switch is pressed and released, the controller interprets that action as a decimal point. This information is then passed on to the feature extractor 303, to the decision tree processor 312 and to the output 313 of the system so that decimal numbers can be expressed by using the command switch and speaking the digits.

The configuration in FIG. 2 has been described above. The configuration of FIG. 1 is obtained by direct connection of outputs 59-62 in FIG. 13 to inputs 110, 109, 111 and 112, respectively, in FIGS. 15 and 16 and by direct connection of the outputs from the microphone switches 34 and 36 in FIGS. 5 and 13 to the inputs 113 and 114, respectively in FIGS. 15 and 16. The microphone 18 can be connected to the input 101 directly (FIG. 15); or the microphone 18 can be selected by logic as in FIG. 13.

It is also clear that a different vocabulary can be chosen. This invention will provide for the recognition of any vocabulary where the knowledge of the presence of nasals, partial closures, plosives/fricatives, and/or voiced stops aids in the recognition. This has been described in a recent article on speech recognition ("Speech Recognition: Turning Theory to Practice", Doddington & Schalk, *IEEE Spectrum*, September, 1981 pg. 31). Seven commercial speech recognizers have been evaluated in that article. In Table III of that article, entitled "The Most Troublesome Words", it has been indicated that all seven products had trouble distinguishing "no" from "go". With this invention, both the nasal "n" and the voiced stop "g" are distinguished at the speech source.

Figure 18:
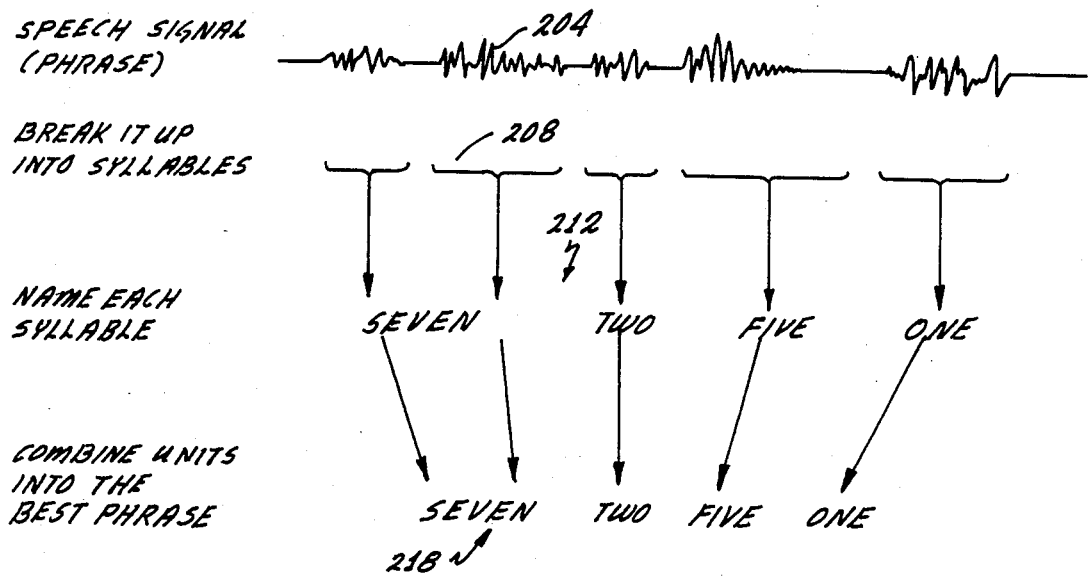
FIG. 18 shows steps for extending the system to continuously spoken speech.
Figure 19:
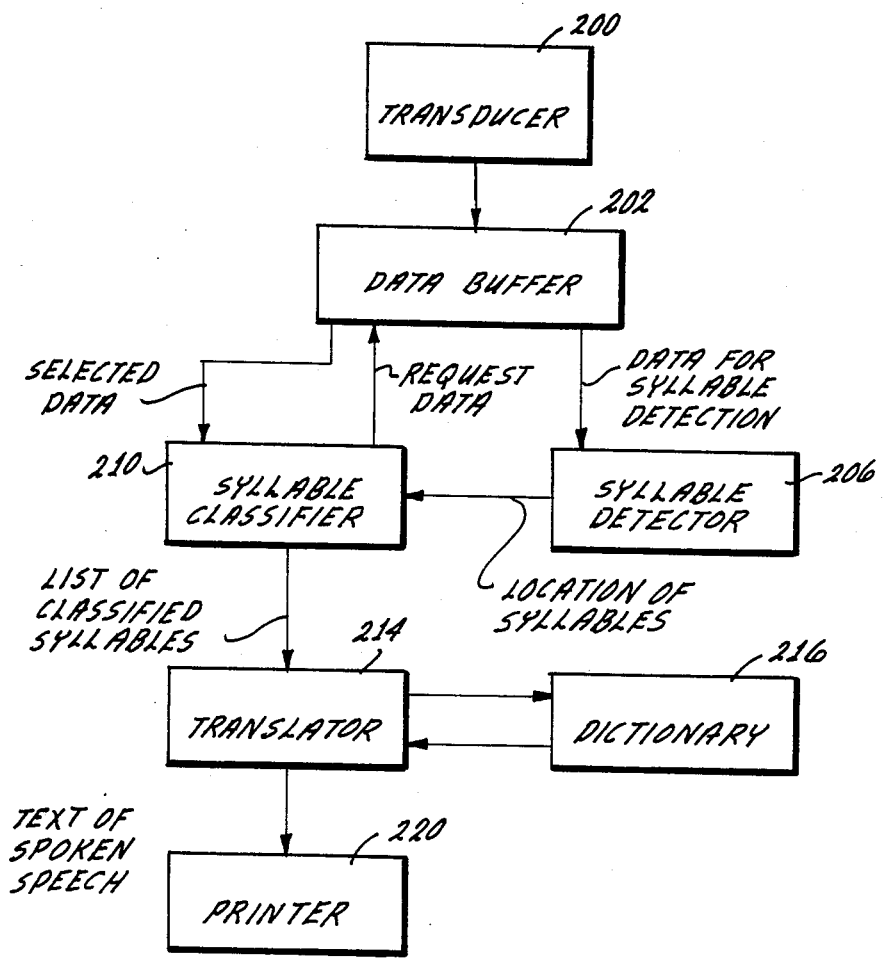
FIG. 19 shows a system modification for implementing the steps shown in FIG. 18.

This invention can be applied to speech spoken continuously as well as to speech spoken as isolated words. FIG. 18 schematically illustrates the steps in doing so, and FIG. 19 is a particular implementation in block form. A syllable classifier 210 in FIG. 19 incorporates a decision tree as in FIG. 17. It recognizes each syllable. The syllables are combined into words by a translator 214 using a dictionary 216.

The signals from a transducer 200 in FIG. 19 are introduced to a data buffer 202. The data buffer 202 may constitute a memory storage unit for storing the information recovered from a medium (such as a magnetic tape) by the transducer 200. This information may be in a form schematically illustrated at 204 in FIG. 18. As will be seen in FIG. 18, the signals for separate syllables are spaced in time from one another to define a phrase, this phrase being constituted by all of the signals 204 in FIG. 18.

The information from the data buffer 202 is introduced to a syllable detector 206 in FIG. 19. The syllable detector 206 operates to detect individual syllables such as the syllables in the words "Seven two five one" in FIG. 18. The syllable detector 206 detects the location of these individual syllables. This is illustrated at 208 in FIG. 18.

The syllable classifier 210 operates upon the signals from the data buffer 202 in accordance with the information provided by the syllable detector 206 as to the location of the syllables. The syllable classifier 210 responds to the location of the syllables in retrieving data from the buffer 202 and uses an algorithm to classify and recognize each syllable as one among many syllables. This is generally indicated at 212 in FIG. 18 for the words "Seven two five one".

The syllable classifier 210 distinguishes at the syllable level. The particular algorithm employed depends upon the syllables to be distinguished. For example, when digits are to be distinguished, the presence of the nasal "n" in a syllable immediately indicates that the syllable is either "one" or "en" as in "seven" or "nine". This simplifies the classification process. The simplification is obtained by algorithms provided in the syllable classifier 210, which may be considered to be a data processor. Similarly, the presence of a sibiliant or fricative can help detect the "s" and "x" in "six", the "s" in "seven" and the "f" in "five". Thus, the problems may be reduced essentially to distinguishing between vowel sounds, which are relatively easy to distinguish.

A translator 214 completes the translation process initiated by the classifier 210. The translator 214 receives the information from the classifier 210 and uses a dictionary 216 to determine the spelling of allowable words in terms of their spelling as syllables. For example, the two syllables "se" and "ven" are combined into "seven". The information obtained from the translator 214 is generally indicated at 218 in FIG. 18. This information may then be printed by a printer 220. It may also be delivered in digitally coded form to a word processor or a computer system. The form of this delivery can be through a medium such as a floppy disc or through a standard communications interface (e.g., the RS-232 standard).

Although this application has been disclosed and illustrated with reference to particular embodiments and particular applications, the principles involved are susceptible of numerous other embodiments and applications which will be apparent to persons skilled in the art. The invention is, therefore, to be limited only as indicated by the scope of the appended claims.

What is claimed is:

1. In combination in a speech recognition system for processing the speech of a speaker,
    first means for detecting acoustic sounds substantially emanating from the mouth of the speaker and for producing signals representing such sounds,
    second means for detecting acoustic sounds substantially emanating from the nose of the speaker and for producing signals representing such sounds,
    identification means responsive to the signals produced by the first and second detecting means for dynamically identifying the signal from a particular one of the first and second detecting means having at least one predetermined dominant characteristic relative to the other signal.

2. The combination set forth in claim 1 wherein the identifying means is for identifying the signal from a particular one of the first and second detecting means only after the integrated amplitude of such signal becomes dominant relative to the integrated amplitude of the signal from the other one of the first and second detecting means continuously for at least a predetermined period of time.

3. A method of processing the speech of a speaker, including the following steps:
    detecting acoustic sounds emanating from the mouth and the nose of the speaker, and
    processing the detected sounds to dynamically identify the detected sound having at least one predetermined dominant characteristic relative to the other sound.

4. A method as set forth in claim 3, including the following steps:
    operating upon the recovered signals to detect syllables of the speech,
    classifying the recovered signals to detect words and phrases, and
    operating upon the classified signals to process the information represented by the speech.

5. A method as set forth in claim 3, including the following steps:
    delaying the selection of the detection sound for a predetermined period of time to insure that the detected sound being identified has the predetermined dominant characteristic.

6. A microphone assembly comprising:
    a housing having first and second ends;
    a first microphone disposed adjacent said first end for detecting acoustic sounds substantially emanating from a corner of a speaker's mouth; and
    second and third microphones disposed adjacent said first end, spaced apart from said first microphone and on opposite sides thereof, one of said second and third microphones for detecting acoustic sounds substantially emanating from the speaker's nose.

7. The microphone assembly defined by claim 6 further comprising first switch means for generating a signal indicating that speech emanating from the speaker's mouth is to be processed as speech by a voice recognition system.

8. The microphone assembly defined by claim 7 further comprising second switch means for generating a signal indicating that speech emanating from the speaker's mouth is to be processed as instructions input to a voice recognition system.

9. The microphone assembly defined by claim 7 wherein said first switch means comprises a first button switch disposed adjacent said second end of said housing.

10. The microphone assembly defined by claim 9 wherein said second switch means comprises a second button switch disposed adjacent said second end of said housing.

11. The microphone assembly defined by claim 10 wherein said first and second button switches comprise a button switch having first and second detent positions disposed adjacent said second end of said housing.

12. The microphone assembly defined by claim 11 including a second button switch having first and second detent positions disposed adjacent said second end of said housing on a side thereof opposite said first button switch having first and second detent positions.

13. The microphone assembly defined by claim 6 further comprising switch means for generating a signal for selecting which of said second and third microphones is to be made active.

14. The microphone assembly defined by claim 13 wherein said switch means comprises first and second button switches disposed adjacent said second end of said housing on opposite sides thereof wherein one of said button switches is depressed depending upon whether the microphone assembly is held in the speaker's right hand or the speaker's left hand.

15. The microphone assembly defined by claim 14 wherein said first and second button switches each have first and second detent positions wherein said first detent position is for generating a signal indicating that speech emanating from the speaker's mouth is to be processed as speech by a voice recognition system and said second detent position is for generating a signal indicating that speech emanating from the speaker's mouth is to be processed as instructions input to said voice recognition system, said signal for selecting which of said second and third microphones is to be made active being generated when said switch is depressed to either of said first detent position and said second detent position.

16. The combination defined by claim 1 further comprising means for providing a distinction between speech to be processed as text and speech to be processed as directives of the speaker.

17. The combination defined by claim 1 further comprising:
(a) filter means for generating signals representing first formant frequencies and second formant frequencies of the signals generated by the first detecting means and the second detecting means; and
(b) tone detection means for generating logic signals which indicate characteristics of the speech sounds detected by the first and second means, said characteristics including nasality, partial closure and plosive.

18. The combination defined by claim 1 further comprising means for producing in a single channel for subsequent processing the signals produced by the first detecting means, the second detecting means and the identification means.

19. The combination defined by claim 17 further comprising:
(a) data buffer means coupled to said filter means and said tone detection means for buffering the data generated by said filter means and said tone detection means;
(b) feature extraction means coupled to said buffer means for generating a set of numerical values for each spoken work, which numerial values are processed by a decision tree to identify the work spoken by the speaker.

20. The micropphone assembly defined by claim 6 wherein the other of said second and third microphones is for detecting sounds substantially emanating from the speaker's throat.

* * * * *

UNITED STATES PATENT AND TRADEMARK OFFICE
CERTIFICATE OF CORRECTION

PATENT NO. : 4,718,096
DATED : 01/05/88
INVENTOR(S) : Meisel

It is certified that error appears in the above-identified patent and that said Letters Patent is hereby corrected as shown below:

| COLUMN | LINE | DESCRIPTION |
|---|---|---|
| 18 | 34 | delete "work" insert --word-- |

Signed and Sealed this

Twentieth Day of December, 1988

Attest:

DONALD J. QUIGG

Attesting Officer

Commissioner of Patents and Trademarks